(12) United States Patent
Narahari et al.

(10) Patent No.: US 12,375,371 B2
(45) Date of Patent: Jul. 29, 2025

(54) CONTROLLING CUSTOMER PREMISES EQUIPMENT VIA THE CLOUD OR NETWORK EDGE TO SUPPORT ADVANCED NETWORK FUNCTIONALITY

(71) Applicant: AT&T Intellectual Property I, L.P., Atlanta, GA (US)

(72) Inventors: Sridhar Narahari, Milpitas, CA (US); Barry Elia, King George, VA (US); Jeffrey Eiber, Jacksonville, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 70 days.

(21) Appl. No.: 18/149,041

(22) Filed: Dec. 30, 2022

(65) Prior Publication Data

US 2024/0223472 A1   Jul. 4, 2024

(51) Int. Cl.
  *H04L 41/5067* (2022.01)
  *H04L 9/40* (2022.01)
  *H04L 43/04* (2022.01)

(52) U.S. Cl.
  CPC .......... *H04L 41/5067* (2013.01); *H04L 43/04* (2013.01); *H04L 63/1416* (2013.01); *H04L 63/1441* (2013.01)

(58) Field of Classification Search
  CPC . H04L 41/5067; H04L 43/04; H04L 63/1416; H04L 63/1441
  See application file for complete search history.

(56) References Cited

U.S. PATENT DOCUMENTS

| | | | | |
|---|---|---|---|---|
| 7,403,487 | B1* | 7/2008 | Foladare | H04L 41/0896 370/252 |
| 7,403,784 | B2* | 7/2008 | Ju | H04W 64/00 342/450 |
| 2014/0098705 | A1* | 4/2014 | Chow | H04L 41/0816 370/254 |
| 2024/0113941 | A1* | 4/2024 | Siddiqui | H04L 41/0895 |

OTHER PUBLICATIONS

Sridhar Narahari et al., "Cloud-Based Application Recognition to Support Application-Aware Functionality on Customer Premises Equipment," U.S. Appl. No. 17/933,847, filed Sep. 20, 2022, 28 pages.

* cited by examiner

*Primary Examiner* — Farzana B Huq

(57) ABSTRACT

An example method for controlling customer premises equipment via the cloud or network edge to support advanced network functionality includes detecting a data flow associated with a customer premises equipment device, identifying an application associated with the data flow, monitoring a performance of the application, determining an action to be taken by the customer premises equipment device to optimize the performance of the application, and sending an instruction to the customer premises equipment device to take the action.

19 Claims, 3 Drawing Sheets

CONTROLLING CUSTOMER PREMISES EQUIPMENT VIA THE CLOUD OR NETWORK EDGE TO SUPPORT ADVANCED NETWORK FUNCTIONALITY

The present disclosure relates generally to computer networks, and relates more particularly to devices, non-transitory computer-readable media, and methods for controlling customer premises equipment via the cloud or network edge to support advanced network functionality.

BACKGROUND

Many modern customer premises equipment (CPE) devices are capable of advanced network functions, including application-aware flow steering (i.e., routing data flows associated with different applications based on an optimal set of metrics), performance monitoring, and firewalling (i.e., implementing policies to monitor and filter incoming and outgoing data flows to minimize exposure to malicious data flows). These advanced network functions provide advanced security, optimized user experience, improved customer service, and increased business productivity in software-defined wide area networks (SD-WANs) and other networks that employ application-aware traffic steering. SD-WANs allow an entire WAN to be managed centrally (e.g., in the cloud), even if the enterprise associated with the WAN is distributed over many geographic locations (e.g., as in the case of a business whose employees are working remotely from different locations).

SUMMARY

The present disclosure broadly discloses methods, computer-readable media, and systems for controlling customer premises equipment via the cloud or network edge to support advanced network functionality. In one example, a method performed by a processing system includes detecting a data flow associated with a customer premises equipment device, identifying an application associated with the data flow, monitoring a performance of the application, determining an action to be taken by the customer premises equipment device to optimize the performance of the application, and sending an instruction to the customer premises equipment device to take the action.

In another example, a non-transitory computer-readable medium may store instructions which, when executed by a processing system in a communications network, cause the processing system to perform operations. The operations may include detecting a data flow associated with a customer premises equipment device, identifying an application associated with the data flow, monitoring a performance of the application, determining an action to be taken by the customer premises equipment device to optimize the performance of the application, and sending an instruction to the customer premises equipment device to take the action.

In another example, a device may include a processing system including at least one processor and a non-transitory computer-readable medium storing instructions which, when executed by the processing system when deployed in a communications network, cause the processing system to perform operations. The operations may include detecting a data flow associated with a customer premises equipment device, identifying an application associated with the data flow, monitoring a performance of the application, determining an action to be taken by the customer premises equipment device to optimize the performance of the application, and sending an instruction to the customer premises equipment device to take the action.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
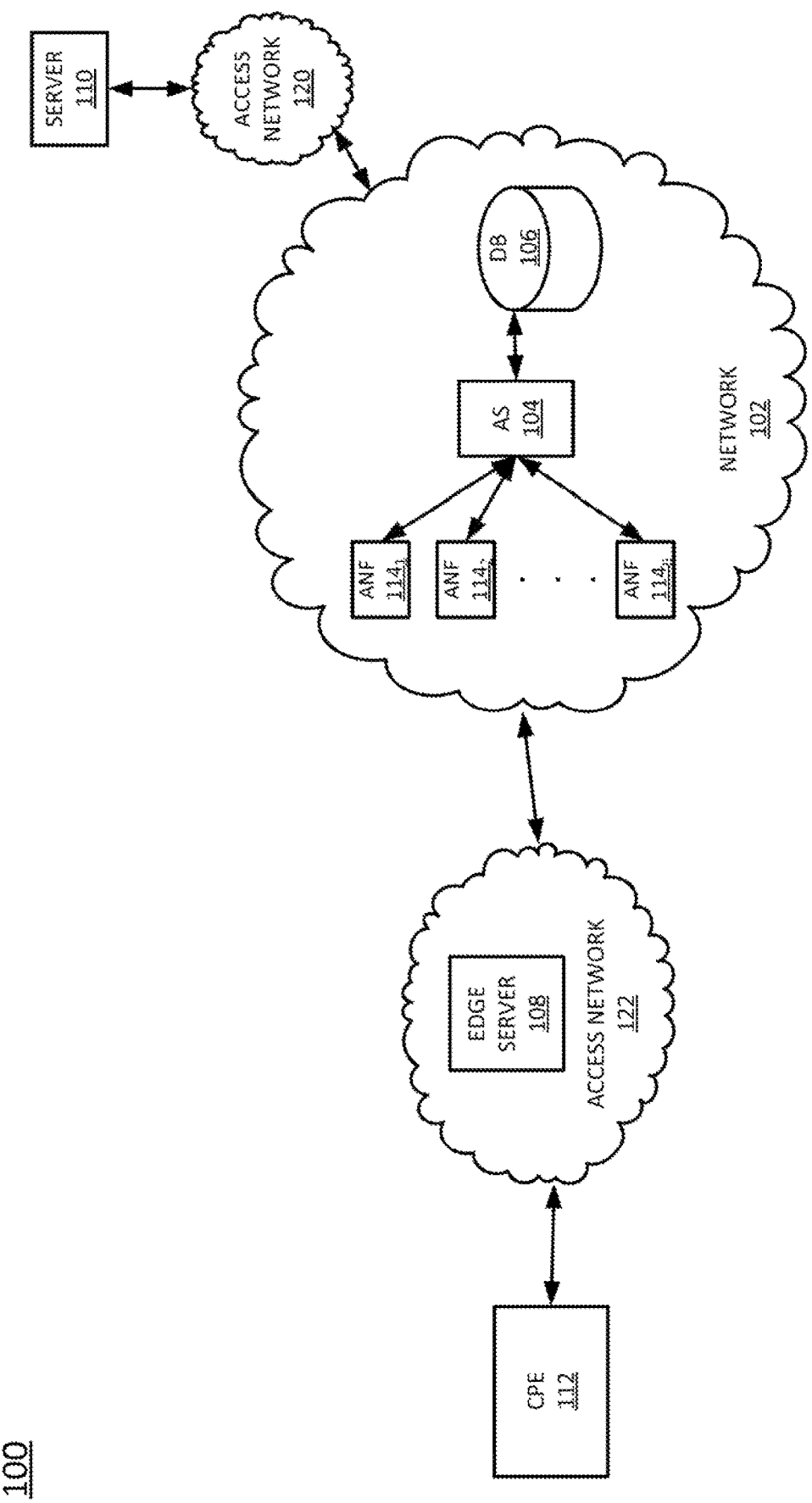
FIG. 1 illustrates an example system in which examples of the present disclosure may operate.

The present disclosure broadly discloses methods, computer-readable media, and systems for controlling customer premises equipment via the cloud or network edge to support advanced network functionality. As discussed above, many modern customer premises equipment (CPE) devices are capable of advanced network functions, including application-aware flow steering (i.e., routing data flows associated with different applications based on an optimal set of metrics), performance monitoring, and firewalling (i.e., implementing policies to monitor and filter incoming and outgoing data flows to minimize exposure to malicious data flows). These advanced network functions provide advanced security, optimized user experience, improved customer service, and increased business productivity in a variety of networks, including software-defined wide area networks (SD-WANs) and other networks that employ application-aware traffic steering, as well as networks that do not employ application-aware traffic steering. SD-WANs allow an entire WAN to be managed centrally (e.g., in the cloud), even if the enterprise associated with the WAN is distributed over many geographic locations (e.g., as in the case of a business whose employees are working remotely from different locations).

These advanced network functions tend to be resource-intensive and to require powerful processing capabilities. However, many CPE devices, including thin CPE devices, may not have the required processing capabilities (or other required resources). Thin CPE devices include customer premises equipment such as routers, switches, voice gateways, set top boxes, home networking adapters, and the like, that are characterized by low compute and processing power, which would normally prevent the devices from executing advanced network functions. Thus, most thin CPEs are unable to take full advantage of advanced network functions. However, there are many scenarios where offering advanced network functionality using only a resource constrained or thin CPE at the customer premises would be beneficial. While customers can purchase more powerful CPEs that support advanced networking functions, the cost of such solutions is often prohibitive for many customers (e.g., customers who are budget constrained), customer types (e.g., customers who manage many different, geographically distributed sites, which increases the total cost of implementing such solutions), and use cases (e.g., remote use cases, where the number of remote employees requiring the solution may be large, which increases the total cost of the solution).

Examples of the present disclosure move advanced, in-line network functions such as application-aware flow steering, performance monitoring, and firewalling, to the cloud or network edge. In one example, a server may be located in the core network or at the network edge. The server performs processing-intensive advanced network functions (e.g., application recognition, flow and/or session monitoring, etc.) on behalf of a CPE device (e.g., a thin CPE device), determines actions to be taken to optimize the experience of an end user of the CPE device (e.g., application-aware flow steering, firewalling, etc.), and sends commands to the CPE device to carry out the actions. Thus, the server in the core network or the network edge effectively performs advanced network functions on behalf of the CPE, so that the CPE is able to leverage the advantages of the advanced network functions without requiring expensive resource upgrades. Moreover, advantages of using thin CPEs, such as lower costs, smaller size/form factor, and the like (which may be beneficial in certain use cases, such as in small retail locations or in remote use cases where smaller devices may be more desirable) may be retained. In further examples, the server could be deployed in the central cloud, such that the application recognition function can be provided in the form of standalone software as a service (Saas).

Although examples of the present disclosure are discussed within the context of CPEs (and thin CPEs in particular), it will be appreciated that the examples disclosed herein are applicable to any system, product, or service that may benefit from advanced network functionality. These and other features of the present disclosure are discussed in greater detail below in connection with FIGS. 1-4.

To further aid in understanding the present disclosure, FIG. 1 illustrates an example system 100 in which examples of the present disclosure may operate. The system 100 may include any one or more types of communication networks, such as wireless networks, wired networks (e.g., broadband, private multi-protocol label switching, etc.), satellite networks (which may be popular in rural areas), and the like related to the current disclosure. It should be noted that an IP network is broadly defined as a network that uses Internet Protocol to exchange data packets. Additional example IP networks include Voice over IP (VOIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VOIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VOD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 4:
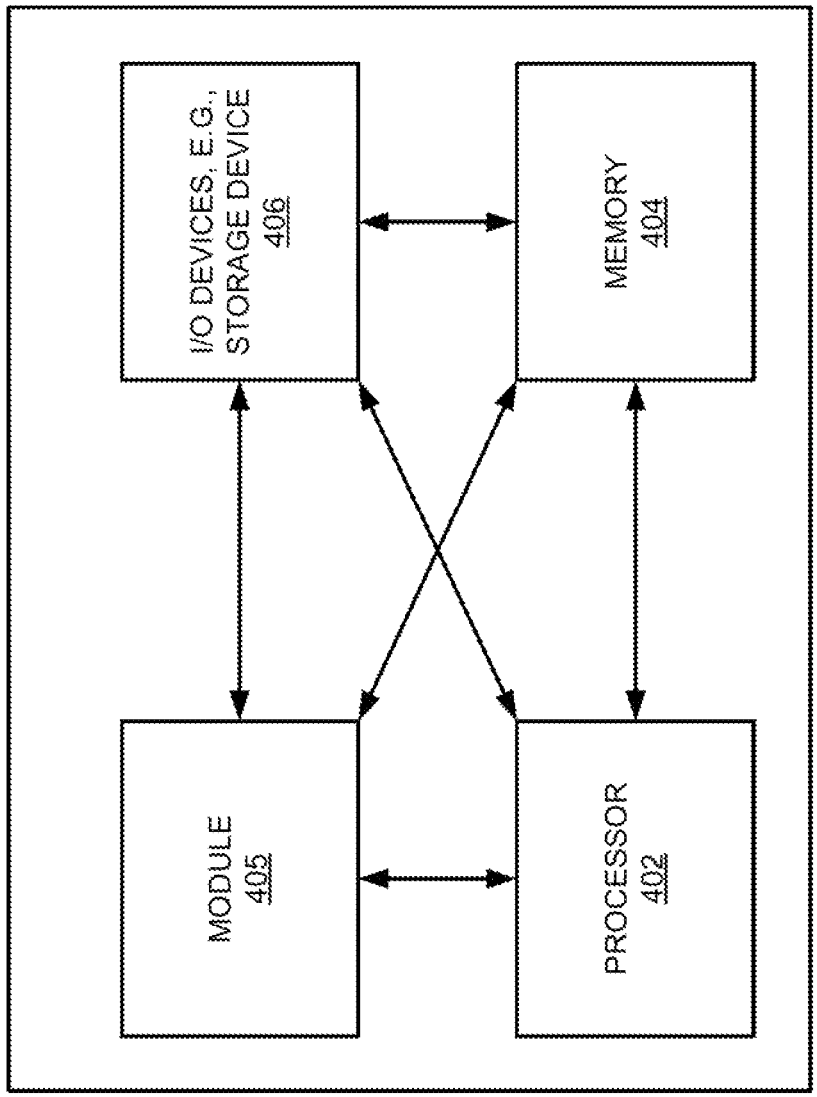
FIG. 4 illustrates an example of a computing device, or computing system, specifically programmed to perform the steps, functions, blocks, and/or operations described herein.

In accordance with the present disclosure, network 102 may include an application server (AS) 104, which may comprise a computing system or server, such as computing system 400 depicted in FIG. 4, and may be configured to provide one or more operations or functions in connection with examples of the present disclosure for controlling customer premises equipment via the cloud or network edge to support advanced network functionality. The network 102 may also include a database (DB) 106 that is communicatively coupled to the AS 104 and one or more in-line advanced network functions (ANFs) $114_1$-$114_n$ (hereinafter individually referred to as an ANF 114 or collectively referred to as ANFs 114) also communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single application server (AS) 104 and single database (DB) 106 are illustrated, it should be noted that any number of servers may be deployed, and which may operate in a distributed and/or coordinated manner as a processing system to perform operations in connection with the present disclosure.

In one example, AS 104 may comprise a centralized network-based server for controlling customer premises equipment via the cloud or network edge to support advanced network functionality. For instance, the AS 104 may host an application that detects data flows between a customer premises equipment (CPE) device 112 and network applications which may be hosted by other application servers, server 110, or other devices in the system 100. The AS 104 may identify the applications based on processing of packets of the data flows. Once an application has been identified, the AS 104 may monitor the performance of the application, for instance by monitoring the data flow(s) associated with the application. In some examples, the AS 104 may determine, through the monitoring, an action that can be taken to optimize or improve the performance of the application.

In one example, the AS 104 may determine the action in conjunction with one or more of the in-line ANFs 114. The ANFs 114 may comprise hardware and/or software for enabling various advanced network functions. For instance, one ANF 114 may be configured to perform application recognition, another ANF 114 may be configured to perform application-aware flow steering, another ANF 114 may be configured to perform real-time performance monitoring, another ANF 114 may be configured to perform context-aware firewalling, and so on.

Once the AS 104 has determined an action to be taken by the CPE device 112, the AS 104 may then communicate the action to the CPE device 112. Subsequently, the CPE device 112 may execute the action in order to optimize performance of the application for the end user of the CPE device 112.

In one example, AS 104 may comprise a physical storage device (e.g., a database server) that stores data that can be used to enable advanced network functions for the CPE device 112. For instance, the AS 104 may store a mapping of data flow identifiers to network links, for use in performing application-aware flow steering on behalf of the CPE device 112. Similarly, the AS 104 may store signatures of known network threats, for use in performing context-aware firewalling on behalf of the CPE device 112. In another example, the DB 106 may store the mapping of data flow identifiers to network links, signatures of known network threats, or other data, and the AS 104 may retrieve the mapping of data flow identifiers to network links, signatures of known network threats, or other data from the DB 106 when needed. In yet another example, the AS 104 may be stateless and store no mappings. For ease of illustration, various additional elements of network 102 are omitted from FIG. 1.

Figure 2:
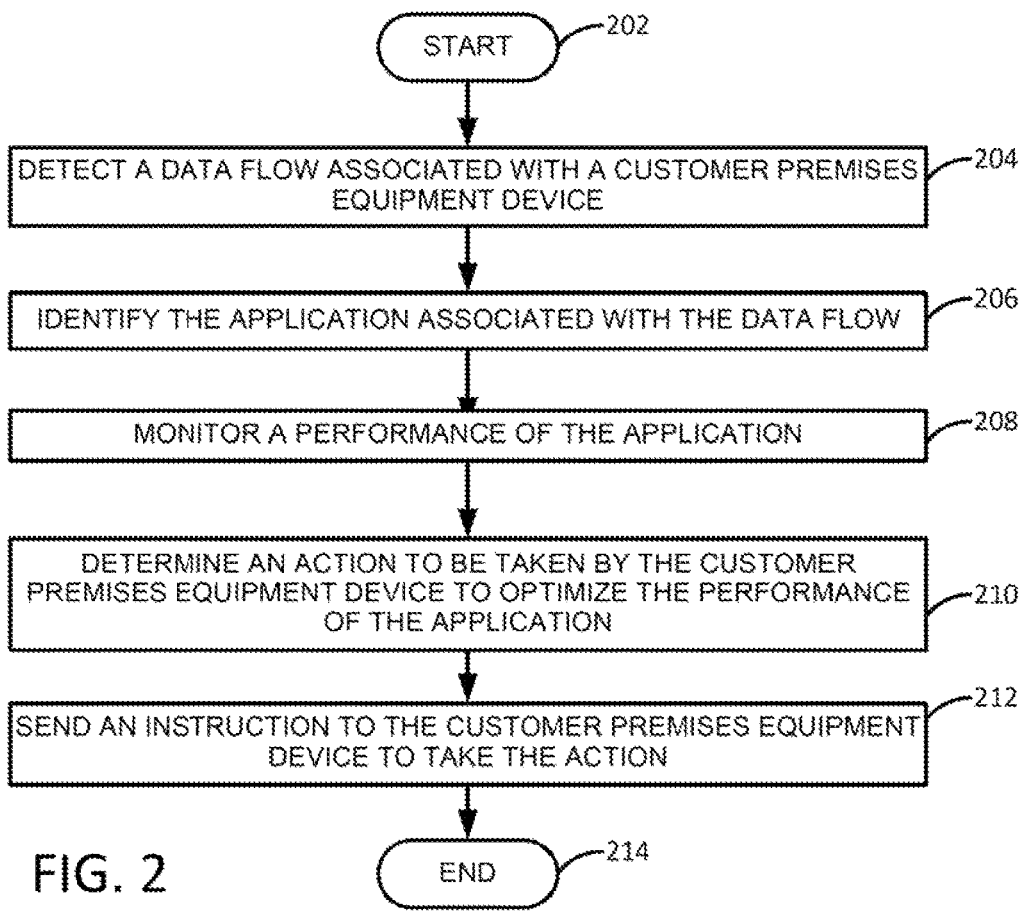
FIG. 2 illustrates a flowchart of an example method for controlling customer premises equipment via the cloud or network edge to support advanced network functionality, in accordance with the present disclosure.

In one example, access network 122 may include an edge server 108, which may comprise a computing system or server, such as computing system 400 depicted in FIG. 4, and may be configured to provide one or more operations or functions for controlling customer premises equipment via the cloud or network edge to support advanced network functionality, as described herein. For instance, an example method 200 for controlling customer premises equipment via the cloud or network edge to support advanced network functionality is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, including CPE device 112. Access networks 120 and 122 may transmit and receive communications between server 110, CPE device 112, application server (AS) 104, other components of network 102, devices reachable via the Internet in general, and so forth. In one example, the CPE device 112 may comprise a thin CPE device such as a router, a switches, a voice gateway, a set top box, a home networking adapter, or the like. In other words, the CPE device 112 may be characterized by low compute and processing power, which would normally prevent the CPE from executing advanced network functions, and more specifically may not have access to the resources needed to leverage advanced network functions such as application-aware flow steering, context-aware firewalling, or the like, on its own. In one example, the CPE device 112 may comprise a computing system or device, such as computing system 400 depicted in FIG. 4, and may be configured to provide one or more operations or functions in connection with examples of the present disclosure for controlling customer premises equipment via the cloud or network edge to support advanced network functionality.

In one example, server 110 may comprise a network-based server for controlling customer premises equipment via the cloud or network edge to support advanced network functionality. In this regard, server 110 may comprise the same or similar components as those of AS 104 and may provide the same or similar functions. Thus, any examples described herein with respect to AS 104 may similarly apply to server 110, and vice versa.

In an illustrative example, the AS 104 may support an application to which the CPE device is connected. The edge server 108 may reside in the data path between the CPE device 112 and the AS 104, or may be provided with the first "m" number of packets of the data flow between the CPE device 112 and the AS 104 (e.g., by another device that may mirror the first "m" number of packets). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between the CPE device 112 and the edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, CPE device 112 may communicate with access network 122, network 102, the Internet in general, etc., via a WLAN that interfaces with access network 122. The edge server 108 may perform the functions for controlling customer premises equipment via the cloud to support advanced network functionality disclosed herein.

It should also be noted that the system 100 has been simplified. Thus, it should be noted that the system 100 may be implemented in a different form than that which is illustrated in FIG. 1, or may be expanded by including additional endpoint devices, CPE devices, access networks, network elements, application servers, etc. without altering the scope of the present disclosure. For instance, the CPE device 112 may be capable of performing application-aware traffic steering from one WAN link to another WAN link. The CPE device 112 may also have no more than one WAN link. As an example, the CPE device 112 may have connections to both a wired network and a wireless network. If the CPE device 112 has only a single WAN link, then application-aware firewalling or filtering could still be performed; however steering across WANs would not be possible (since there is only one WAN link). In this case, application awareness provided by the AS 104 could still facilitate other functions (aside from steering across WANs) that optimize user experience, such as, but not limited to, WiFi optimization, application-aware quality of service (QOS), or Wifi frequency band steering.

In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 2 illustrates a flowchart of an example method 200 for controlling customer premises equipment via the cloud or network edge to support advanced network functionality, in accordance with the present disclosure. In particular, the method 200 describes a process that may be performed by a cloud- or edge-based service or system. Thus, in one example, steps, functions and/or operations of the method 200 may be performed by a device as illustrated in FIG. 1, e.g., AS 104, edge server 108, or any one or more components thereof. In one example, the steps, functions, or operations of method 200 may be performed by a computing device or system 400, and/or a processing system 402 as described in connection with FIG. 4 below. For instance, the computing device 400 may represent at least a portion of the AS 104 or edge server 108 in accordance with the present disclosure. For illustrative purposes, the method 200 is described in greater detail below in connection with an example performed by a processing system, such as processing system 402.

The method 200 begins in step 202. In step 204, the processing system may detect a data flow associated with a customer premises equipment (CPE) device. In one example, the processing system may comprise a device that is remote from the CPE device (i.e., separate from and not physically connected to the CPE device). For instance, the CPE device may be deployed in a home network, an enterprise network, or another private customer network connected to a larger telecommunications network. The processing system may, on the other hand, be deployed in the cloud, at the edge of the telecommunications network, or elsewhere (e.g., near the customer side, but not on the customer side). As an example, the processing system may reside in the data path between the CPE device and the server or system that supports an application with which the data flow is associated. In this case, the processing system may be tied to a secure access service edge (SASE) or an SD-WAN gateway. In another example, the processing system may not reside in the data path, but may have a view of the data path from the outside (e.g., through mirroring of packets or other methods). In this case, the processing system may not see the entire data flow, but may instead receive the first "m" number of packets of the data flow, where m is a number that is large enough for the processing system to recognize the application.

In one example, the CPE device is a device that is not capable of leveraging advanced network functions (such as application-aware flow steering, context-aware firewalling, or the like) on its own, and may rely on the processing system for instructions to support these functions. Thus, the processing system may have access to greater processing power than the CPE device. For instance, the CPE device may be a thin CPE device, i.e., a device that is characterized by low compute and processing power, which would normally prevent the device from executing advanced network functions. As an example, thin CPE devices could include customer premises equipment such as routers, switches, voice gateways, set top boxes, home networking adapters, and the like.

In step 206, the processing system may identify the application associated with the data flow. In one example, one or more of a number of known application recognition techniques could be used to identify the application. For instance, the processing system may identify the application through fingerprinting or deep packet inspection (DPI). In one example, DPI may be performed without hardware assistance. In another example, the processing system may recognize applications without disrupting hardware acceleration. The processing system may utilize any state-of-the-art technique(s) to minimize the computational overhead incurred by performing the DPI.

In step 208, the processing system may monitor a performance of the application. In one example, in-line monitoring is performed at the processing system (rather than, e.g., at the CPE device directly). This minimizes or eliminates the need for the CPE device to host expensive monitoring and in-line functions. This stands in contrast to traditional SDN, which focuses on controlling endpoint devices based on administrator-defined policies.

In one example, the monitoring may be performed in conjunction with one or more in-line, advanced network functions. These in-line, advanced network functions may include, for instance, application recognition functions, flow monitoring functions, flow-steering functions, threat detection functions, and other advanced network functions.

In step 210, the processing system may determine an action to be taken by the customer premises equipment device to optimize the performance of the application. For instance, the processing system may identify (in conjunction with a flow monitoring function) one or more flows associated with the application that should be treated as high priority. For instance, the processing system, or the flow monitoring function, may know that flows destined for a certain IP address (e.g., an IP address of a health monitoring application) should be transferred with the lowest possible latency. In this case, the processing system may determine that these high priority flows should be steered over a different WAN link than the current WAN link that the high priority flows are currently being steered over.

In another example, the processing system may identify (in accordance with a threat detection function) a flow that matches a signature for a known threat. For instance, the processing system, or the threat detection function, may know that flows destined for a certain IP address or port number may be likely to be part of a distributed denial of service (DDOS) attack (e.g., the IP address or port number may be associated with a server that is currently the target of a DDOS attack). In this case, the processing system may determine that the flow destined for the certain IP address or port number should be blocked or quarantined.

In further examples, the processing system may determine actions to be taken in accordance with other advanced network functions, where the other advanced network functions may or may not be application aware. For instance, these other advanced network functions may include application-aware flow steering, real-time performance monitoring, context-aware firewalling, application recognition, or other advanced application, session protection, and/or security functions.

In step 212, the processing system may send an instruction to the customer premises equipment device to take the action. For instance, where the processing system has determined that one or more high priority flows should be steered over a different WAN link than the current WAN link over which the high priority flows are currently being steered, the processing system may send a "SteerWAN(flow)" command to the CPE device, where the command identifies the high priority flow(s) and the WAN link(s) over which the flow(s) should be steered.

Where the processing system has determined that one or more flows matching signatures for known threats should be blocked or quarantined, the processing system may send a "blockFlow(flow)" command to the CPE device, where the command identifies the flow(s) that should be blocked or quarantined.

In one example, the signaling that is used to send the instruction to the CPE device can be performed using any one or more of a number of remote signaling mechanisms, including, but not limited to, the Google remote procedure call (gRPC) protocol, border gateway protocol (BGP) Flow-Spec (e.g., if the instruction is to be used to implement firewalling), or other protocols.

Once the CPE device has the instruction, the CPE device may initiate a local action in accordance with the instruction, where the local action may leverage an advance network function such as application steering, firewalling, or other application-aware functionalities that the CPE device might not have otherwise had the capability to implement.

In step 214, the method 200 may end. However, the method 200 may be repeated for additional data flows associated with the CPE device, which may be associated with other applications.

Figure 3:
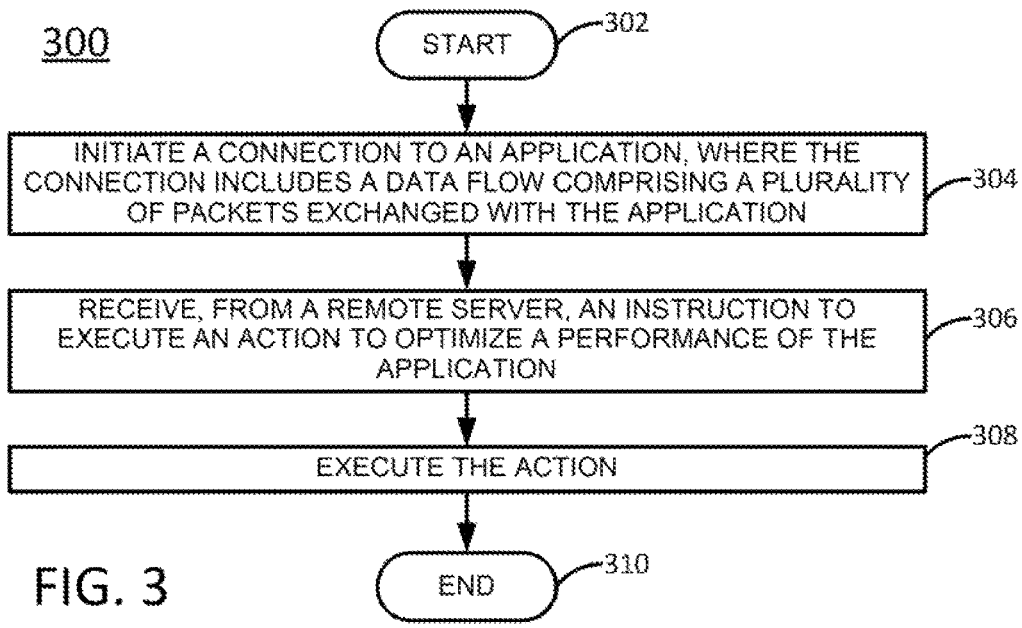
FIG. 3 illustrates a flowchart of an example method for controlling customer premises equipment via the cloud or network edge to support advanced network functionality, in accordance with the present disclosure.

FIG. 3 illustrates a flowchart of an example method 300 for controlling customer premises equipment via the cloud or network edge to support advanced network functionality, in accordance with the present disclosure. In particular, the method 300 describes a process that may be performed by a customer premises equipment device. Thus, in one example, steps, functions and/or operations of the method 300 may be performed by a device as illustrated in FIG. 1, e.g., CPE 112 or any one or more components thereof. In one example, the steps, functions, or operations of method 300 may be performed by a computing device or system 400, and/or a processing system 402 as described in connection with FIG. 4 below. For instance, the computing device 400 may represent at least a portion of the CPE 112 in accordance with the present disclosure. For illustrative purposes, the method 300 is described in greater detail below in connection with an example performed by a processing system, such as processing system 402.

The method 300 begins in step 302. In step 304, the processing system may initiate a connection to an application, where the connection includes a data flow comprising a plurality of packets exchanged with the application (i.e., between the processing system and the application).

In one example, the processing system may comprise part of a device that is not capable of leveraging advanced network functions on its own, and may utilize table-driven routing logic (e.g., based on 5-tuples or destination prefix). For instance, the processing system may be part of a CPE device such as a thin CPE device, i.e., a device that is characterized by low compute and processing power, which would normally prevents the device from executing advanced network functions. As an example, thin CPE devices could include customer premises equipment such as routers, switches, voice gateways, set top boxes, home networking adapters, and the like. As such, the processing system may not "initiate" the data flow in the sense that the processing system is an origination point or an endpoint for the data flow. Instead, in many cases, the processing system (or the CPE device of which the processing system is a part) may route the data flow from a user endpoint device in a customer network, where the user endpoint device is the origination point for the data flow and the processing system is situated in the data path between the user endpoint device and the application.

In one example, the application is supported by an application server that is remote from the processing system, and the connection to the application comprises a connection made over a telecommunications network (where, for instance, the processing system may reside in a home network, an enterprise network, or another private customer network, and the application server may reside in a core network to which devices in the customer network connect via an access network).

In step 306, the processing system may receive, from a remote server, an instruction to execute an action to optimize a performance of the application. In one example, the remote server is a computing device that is separate from and not physically connected to the processing system, and that has access to greater processing power than the processing system. For instance, the remote server may be deployed in the cloud, at the edge of the telecommunications network, or elsewhere (e.g., near the customer side, but not on the customer side). As an example, the remote server may reside in the data path between the CPE device and the application server or system that supports the application with which the connection was initiated. In this case, the remote server may be tied to a SASE or an SD-WAN gateway. In another example, the remote server may not reside in the data path, but may have a view of the data path from the outside (e.g., through mirroring of packets or other methods). In this case, the remote server may not see the entire data flow, but may instead receive the first "m" number of packets of the data flow, where "m" is a number that is large enough for the remote server to recognize the application.

As discussed above, the action may be an action that optimizes the performance of the application from the perspective of the processing system. For instance, the action may be an action that would be taken by an advanced network function. As an example, the instruction may comprise a "steerWAN(flow)" command that instructs the processing system to steer a flow associated with the application over a specific WAN link (e.g., a WAN link other than a WAN link over which the flow is currently being steered). In this case, the instruction may identify the flow to be steered and may identify the WAN link over which the flow is to be steered.

As another example, the instruction may comprise a "blockFlow(flow)" command that instructs the processing system to quarantine or block a flow associated with the application. In this case, the instruction may identify the flow to be blocked or quarantined and may optionally identify a reason for the flow being blocked or quarantined.

In further examples, the instruction may specify actions to be taken in accordance with other advanced network functions, where the other advanced network functions may or may not be application aware. For instance, these other advanced network functions may include application-aware flow steering, real-time performance monitoring, context-aware firewalling, application recognition, or other advanced application, session protection, and/or security functions.

In one example, the signaling by which the processing system receives the instruction may be performed using any one or more of a number of remote signaling mechanisms, including, but not limited to, the Google remote procedure call (gRPC) protocol, border gateway protocol (BGP) Flow-Spec (e.g., if the instruction is to be used to implement firewalling), or other protocols.

In step 308, the processing system may execute the action (i.e., the action that the remote server instructed the processing system to execute). For instance, if the instruction instructed the processing system to block or quarantine a particular incoming or outgoing flow, then the processing system may block or quarantine the particular incoming or outgoing flow. If the instruction instructed the processing system to steer a particular flow over an alternate WAN link, then the processing system may steer the particular flow over the alternate WAN link. Thus, executing the action allows the processing system to leverage advanced network functions without having to locally perform the processing that is necessary to enable the advanced network functions. The processing system may rely on the remote server to perform that processing, and simply act according to the remote server's instructions.

In step 310, the method 300 may end.

It should be noted that the method 200 and the method 300 may be expanded to include additional steps or may be modified to include additional operations with respect to the steps outlined above. In addition, although not specifically specified, one or more steps, functions, or operations of the method 200 and the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIGS. 2 and 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Examples of the present disclosure therefore move the processing associated with leveraging advanced network functions, such as application recognition, application-aware flow steering, context-aware firewalling, and the like, to the cloud or network edge. In one example, a server located in the core network or at the network edge (and having access to greater processing power than a device that is connected to the application) may recognize the application on behalf of the device. The server may determine an action that will optimize the performance of application from the perspective of the device, where the action may be based at least in part on the recognition of the application. The server may instruct the device to take the action. The device may subsequently take the action, allowing the device to leverage advanced network functions despite its limited resources. Thus, examples of the present disclosure may be especially useful in helping thin CPE devices to leverage advanced functionality.

Moreover, in some examples, the methods 200 and 300 may be augmented with network analytics. The network analytics may be generated by software that runs at the network edge, on the CPE device, or on insights derived from a network analytics application programming interface (API). The network analytics would add a performance awareness component to the overall methods described herein, which would enable application awareness to be combined with performance awareness and facilitate decision making that accounts for both application awareness and performance awareness.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for controlling customer premises equipment via the cloud or network edge to support advanced network functionality, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or the method 300 or the entire method 200 or method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one example, instructions and data for the present module or process 405 for controlling customer premises equipment via the cloud or network edge to support advanced network functionality (e.g., a software program comprising computer-executable instructions) can be loaded into memory 404 and executed by hardware processor element 402 to implement the steps, functions, or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for controlling customer premises equipment via the cloud or network edge to support advanced network functionality (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   detecting, by a processing system including at least one processor, a data flow associated with a customer premises equipment device, wherein the customer premises equipment device is a thin customer premises equipment device;
   identifying, by the processing system, an application associated with the data flow;
   monitoring, by the processing system, a performance of the application;
   determining, by the processing system, an action to be taken by the customer premises equipment device to optimize the performance of the application; and
   sending, by the processing system, an instruction to the customer premises equipment device to take the action, wherein the action comprises steering the data flow over an alternate network link in accordance with an application-aware flow steering function, wherein the alternate network link has a lower latency than a current network link over which the data flow is being steered, and wherein the steering comprises routing packets of the data flow over the alternate network link.

2. The method of claim 1, wherein the customer premises equipment device is separate from and not physically connected to the processing system.

3. The method of claim 2, wherein the processing system resides in a data path between the customer premises equipment device and a server that supports the application.

4. The method of claim 3, wherein the processing system is tied to a secure access service edge.

5. The method of claim 3, wherein the processing system is tied to a software-defined networking wide area network gateway.

6. The method of claim 1, wherein the processing system resides outside of a data path between the customer premises equipment device and a server that supports the application, and wherein the processing system receives a first number of packets of the data flow.

7. The method of claim 1, wherein the processing system has access to a greater processing power than the thin customer premises equipment device.

8. The method of claim 1, wherein the identifying is performed using a fingerprinting technique.

9. The method of claim 1, wherein the identifying is performed using a deep packet inspection technique.

10. The method of claim 1, wherein the monitoring determines that the data flow matches a signature of a known threat.

11. The method of claim 10, wherein the action further comprises blocking the data flow in accordance with a firewalling function.

12. The method of claim 10, wherein the action further comprises quarantining the data flow in accordance with a firewalling function.

13. The method of claim 1, wherein the processing system is physically located at an edge of a communications network to which the customer premises equipment device is connected.

14. The method of claim 1, wherein network analytics provide the processing system with insight into the performance of the application, such that the processing system is able to make a decision regarding the application that is both application aware and performance aware.

15. A non-transitory computer-readable medium storing instructions which, when executed by a processing system including at least one processor, cause the processing system to perform operations, the operations comprising:
   detecting a data flow associated with a customer premises equipment device, wherein the customer premises equipment device is a thin customer premises equipment device;
   identifying an application associated with the data flow;
   monitoring a performance of the application;
   determining an action to be taken by the customer premises equipment device to optimize the performance of the application; and
   sending an instruction to the customer premises equipment device to take the action, wherein the action comprises steering the data flow over an alternate network link in accordance with an application-aware flow steering function, wherein the alternate network link has a lower latency than a current network link over which the data flow is being steered, and wherein the steering comprises routing packets of the data flow over the alternate network link.

16. The non-transitory computer-readable medium of claim 15, wherein the processing system has access to a greater processing power than the thin customer premises equipment device, and wherein the alternate network link has a lower latency than a current network link over which the data flow is being steered.

17. A device comprising:
   a processing system including at least one processor; and
   a non-transitory computer-readable medium storing instructions which, when executed by the processing system, cause the processing system to perform operations, the operations comprising:
      detecting a data flow associated with a customer premises equipment device, wherein the customer premises equipment device is a thin customer premises equipment device;
      identifying an application associated with the data flow;
      monitoring a performance of the application;
      determining an action to be taken by the customer premises equipment device to optimize the performance of the application; and
      sending an instruction to the customer premises equipment device to take the action, wherein the action comprises steering the data flow over an alternate network link in accordance with an application-aware flow steering function, wherein the alternate network link has a lower latency than a current network link over which the data flow is being steered, and wherein the steering comprises routing packets of the data flow over the alternate network link.

18. The device of claim 17, wherein the processing system has access to a greater processing power than the thin customer premises equipment device, and wherein the alternate network link has a lower latency than a current network link over which the data flow is being steered.

19. The device of claim 17, wherein the monitoring determines that the data flow matches a signature of a known threat.

* * * * *